United States Patent Office 3,057,807
Patented Oct. 9, 1962

3,057,807
PROCESS FOR PREPARING BORIA PROMOTED CATALYST
Robert P. Cox, Newark, and Douglas H. Martin, Harrington Park, N.J., assignors to The M. W. Kellogg Company, Jersey City, N.J., a corporation of Delaware
No Drawing. Filed Aug. 31, 1956, Ser. No. 607,295
1 Claim. (Cl. 252—432)

This invention relates to a hydrogenation process and more particularly relates to a process for the hydrogenation of a hydrocarbon fraction in the presence of a particular catalyst and under selected conditions of operation.

The hydrogenation of hydrocarbons has been a field of investigation which has long taxed the ingenuity of many investigators. With some exceptions, the desirability of liquid fuels and lubricants is roughly proportional to the combined hydrogen that each contains, with the exception of cracked products, however, petroleum hydrocarbons contain little or none of the olefinic groups so that deep-seated chemical changes are necessary to permit the entrance of hydrogen atoms into the oil molecules. High grade kerosenes are made up of saturated hydrocarbons, paraffins and naphthenes, and are low in sulfur, nitrogen and oxygen compounds. Kerosene distillates from young crudes usually possess few or none of these characteristics. By hydrogenation, aromatics can be converted to naphthenes, any olefins present are saturated, while sulfur, nitrogen, and other extraneous elements are substantially removed probably as hydrogen sulfide, ammonia, etc. by the cracking and reduction of corresponding compounds.

In one embodiment, the present invention relates to a process for hydrogenating a hydrocarbon fraction which comprises subjecting said fraction to contact at hydrogenating conditions with a catalyst comprising platinum-alumina promoted with boron oxide.

In a specific embodiment, the present invention relates to a process of hydrogenating an unsaturated hydrocarbon fraction which comprises subjecting said fraction to contact at hydrogenating conditions with a catalyst prepared by precipitating alumina with from about .01% to about 10% by weight of platinum, drying and reducing the precipitated composite and impregnating said composite from about 15% to about 25% by weight boron oxide.

In another embodiment, the present invention relates to a process for hydrogenating a kerosene fraction which comprises subjecting said fraction to hydrogenating conditions with net consumption of hydrogen in the presence of a catalyst comprising platinum-alumina promoted with boron oxide.

In another specific embodiment, the present invention relates to a process for hydrogenating an aromatic containing hydrocarbon fraction boiling in the range of from about 325° F. to about 550° F. which comprises contacting said fraction with a hydrogen containing gas in the presence of a platinum-alumina-boria catalyst containing from about .01% to about 10% by weight platinum and boron oxide in an amount greater than 15 percent by weight of the catalyst composite and more usually from about 15% to about 25% by weight boron oxide.

The present invention relates to a process for hydrogenating a hydrocarbon fraction particularly a kerosene fraction boiling in the range of from about 325° F. to about 550° F. containing unsaturated components therein. The hydrocarbon fraction is contacted under hydrogenation conditions with a hydrogenating catalyst hereinafter described in the presence of and net consumption of hydrogen to cause selective hydrogenation of said hydrocarbon with minimum hydrocracking to form a hydrogenated product substantially free of unsaturated products and of improved smoke point.

In accordance with the process of the present invention, a hydrocarbon fraction, particularly kerosene fraction, boiling in the range of from about 325° F. to about 550° F. is contacted with a catalyst composite comprising platinum-alumina promoted with boron oxide in the presence of hydrogen, a partial pressure of which is maintained within the range of from about 15 p.s.i.a. to about 1500 p.s.i.a. preferably from about 50 p.s.i.a. to about 800 p.s.i.a., at a temperature in the range of from about 60° F. to about 800° F., preferably from about 400° F. to about 700° F., a pressure in the range of from about 0 p.s.i.g. to about 2000 p.s.i.g. preferably from about 300 p.s.i.g. to about 1000 p.s.i.g. and a space velocity, defined as the pounds of feed per hour per pound of catalyst, in the range of from about 0.5 to about 20, preferably about 2 to about 8, whereby saturation of the olefinic components therein and conversion of aromatics to naphthenes is accomplished with a substantial increase in smoke point of the hydrogenated product. It is not essential that pure hydrogen be used in applicants' process. That is, a hydrogen containing gas may be employed in sufficient quantities to provide the necessary hydrogen partial pressure within the range specified above.

The catalysts of the present invention are especially suitable for the hydrogenation of the aromatic constituents of petroleum fractions, for example, the properties of the hydrocarbon fraction containing aromatic hydrocarbons may be improved by hydrogenating in accordance with the present invention. Other unsaturated hydrocarbons, such as olefins and hydrocarbon mixtures containing such unsaturated hydrocarbons, may advantageously be hydrogenated in the presence of the present catalyst. The catalysts of the present invention are effective for the hydrogenation of aromatic hydrocarbons such as naphthalenes under relatively mild conditions, the optimum conditions in a given application being dependent upon the charge stock, the degree of hydrogenation desired and the like. In general, using the present catalyst, hydrogenation is advantageously obtained by operating within the conditions set forth above.

In preparing catalysts, according to the present invention, it is recommended that the alumina be mixed as an undried hydrate with the dispersion containing the platinum metal. For alumina and alumina gel, the best results in dispersing the metal, such as platinum or palladium, have been obtained, by peptizing the gel with acid or other suitable agents to a pH of from about 3.0 to about 8.0 and preferably between about 4.0 and 6.0 to provide a thin workable mixture desirable before adding the metal compound and a promoting or activating agent which may be mercury, zinc, cadmium or a compound thereof. It is also contemplated that an alumina gel carrier may include stabilizers designed to improve the resistance of the catalyst to extreme regeneration temperatures. Where storage of the alumina is required by manufacturing considerations, the alumina may be dried and temperatures below about 400° F. are suggested for the purpose. The expression "gel" is employed in its broad sense herein in connection with alumina as well as hydrates thereof, which are in gel form, derived from gels or capable of forming gels by suitable adjustment of the acidity.

The promoting or activating agent is added during a catalyst preparation. Generally, the promoting agent can be added to (1) the carrier material either before or after drying and/or reaching calcination temperatures and before admixed with the platinum or palladium compound, (2) the platinum or palladium compound prior to admixture with the carrier material; or (3) the mixture of the carrier material and platinum or palladium compound either before or after drying. The promoting agent can be used in the form of an organic or inorganic compound of mercury, zinc or cadmium or mixtures of the foregoing compounds. The organic compounds of mercury, zinc and cadmium include the oxides, hydroxides and salts thereof. The inorganic salts of mercury, zinc and cadmium include, for example, the chlorides, chlorates, bromides, nitrites, sulfates, nitrates, sulfides, sulfites, carbonates, bicarbonates, oxy-chlorides, fluorides, iodides, phosphates, phosphites, etc. Specific examples of inorganic compounds of mercury, zinc and cadmium are mercuric bromide, mercuric chlorate, mercuric chloride, mercuric cyanide, mercuric nitrate, zinc acetate, zinc bromide, zinc chlorate, zinc hydroxide, zinc nitrate, zinc sulfide, cadmium acetate, cadmium carbonate, cadmium hydroxide, cadmium cyanide, cadmium iodide, etc.

The organic compounds of mercury, zinc and cadmium which are useful as promoting agents include a variety of classes such as for example, the salts of the aliphatic and aromatic carboxylic acids, the aliphatic and aromatic sulfur acids, as well as the aliphatic and aromatic phosphorous acids, etc. Particularly useful compounds of mercury, zinc and cadmium are the aliphatic carboxylate salts such as those derived from the fatty acids, the carbonic acids, the thiocarbonic acids, etc. Specific examples of promoter salts of the aliphatic carboxylic acids are the mono-basic types, such as for example, mercurous acetate, mercuric propionate, mercuric butyrate, mercuric valerate, zinc acetate, zinc formate, zinc caproate, cadmium acetate, cadmium propinate, cadmium heptanoate, mercury ethyl carbamate, mercury propyl carbamate, zinc butyl carbamate, cadmium pentyl carbamate, mercury ethyl xanthate, zinc propyl xanthate, cadmium butyl xanthate, etc. The aliphatic polycarboxylic acids can also be used. Useful mercury, zinc and cadmium salts of aromatic carboxylic acids can be of the mono- or polybasic type. Examples of such salts are mercurous benzoate, zinc benzoate, cadmium benzoate, mercuric phthalate, zinc phthalate, cadmium phthalate, mercurous salicylate, zinc salicylate, cadmium salicylate, etc.

It is preferred that the promoting agent volatilize from the catalyst mass at or before calcination temperatures. In some instances the promoting agent is not volatilized at such temperatures, consequently the calcination operation may be conducted under subatmospheric pressures in order to remove substantially all or completely the promoting agent from the catalyst mass. Moreover, it is preferred to employ promoting agents which volatilize from the catalyst mass at a temperature not greater than about 1200° F. It should not be understood that the promoting agents described above are equivalent in efficacy for the purpose of this invention, because under certain conditions some are more desirable or effective than others.

In preparing the catalysts of the present invention, an activator and a solution or dispersion of a platinum or palladium-containing substance are mixed with the carrier. Upon heating, metallic platinum or palladium is fixed on the supporting material. The activating substance or reaction products thereof may remain in the final catalyst in certain instances but preferably this is volatilizable matter, that is, matter which evaporates or decomposes at or below either the temperature at which the catalyst is calcined or the operating temperatures at which the catalyst is maintained during conversion or regeneration reactions; these temperatures usually being less than about 1050° F.

The platinum or palladium metal of the present invention is desirably commingled with the other ingredients of the new catalyst in the form of a suspension or slurry. Such suspensions are readily prepared by saturating an aqueous solution of chloroplatinic or chloroplatinous acid, various platinum amine complexes, and the equivalent compounds of other group 8 metals with hydrogen sulfide. In hydrogen sulfide treated chloroplatinic acid, the metal is believed to be present chiefly as a finely divided precipitate or suspension of platinic sulfide, but it is likely that some of the sulfide is converted to oxysulfide by reaction with oxygen in the air especially during prolonged stirring. In addition, some of the platinum may be in the elementary form. Regardless of the exact composition of the products resulting from the hydrogen sulfide treatment, they are accurately described herein as a sulfurized platinum containing slurry. Compounds other than the sulfides may also supply the necessary platinum or palladium; for example, chloroplatinic acid, ammonium and potassium chloroplatinates and chloroplatinites or the corresponding palladium compounds may be added directly to the carrier. Substances readily decomposable or reducible to metallic platinum or palladium by heating or the action of reducing agents are thought to produce the best catalyst. The group 8 metal content of the final catalyst should be between about .01% and 10.0% by weight. High activities for the group 8 metal catalyst have been obtained with those containing from .01% to 5.0% of the metal.

In preparing a group 8 metal catalyst containing platinum or palladium, alumina gel is desirably washed substantially free of halides and any alkalies, that is to halogen and alkali contents below about .01% by weight on a dry basis, and then slurried in water or other suitable liquid. Then the activator and the metal compounds are introduced. It is recommended that both of these materials be added as solutions or dispersions in any suitable liquid which is compatible with the other components of the mixture. For best results, the gel should be peptized with an acid to thin it, thereby promoting even distribution of the platinum or palladium compound. While excellent results have been obtained by thoroughly mixing the mercuric salt or other activating material with the carrier prior to the addition of the platinum or palladium compound, there is evidence that adding the platinum or palladium salt to the peptized gel before introducing the mercury compound produces an equally good and possibly superior catalyst.

After the activator and group 8 metal compound have been thoroughly mixed with the carrier material, it is dried and calcined. In the case of alumina gel carriers and the like, the drying temperature is not critical. Heating to 210–250° F. for about 15 to 50 hours is suggested, or the slurry may be flash dried and calcined by being placed in an oven maintained at the calcining temperature, for example, 1000° F. During heating, the metal compounds, such as platinum or palladium, are decomposed or reduced to the metal which is fixed on the carrier, all mercury containing substances are driven off and the gel is converted from the hydrated form to the anhydrous state. In cases where a pelleted catalyst is desired, the contact material is dried and partially calcined, cooled, mixed with a mold lubricant if necessary, pelleted and recalcined. Regardless of whether a catalyst is calcined in one or two stages, it should be heated to a temperature above about 400° F., but not exceeding the temperature at which substantial deactivation of the catalyst commences, for a period of from about 2 to about 6 or more hours. It is preferred to calcine alumina gels bearing platinum or palladium between about 600 and about 1200° F. for about 3 to 6 hours. Thermal decomposition appears to be the best method of reducing the metal compound, but it is also contemplated that this may be accomplished by passing hydrogen over the dry material while heating to only moderately elevated temperatures. The dried and calcined alumina carrier containing the group 8 metal is then treated with a boric acid solution in stages to incorporate therein the desired quantity of boron in the final catalyst. The boric acid may be incorporated in the catalyst in a multiplicity of stages with drying of the catalyst composite between stages. The final catalyst is then dried and calcined in the presence of hydrogen at a temperature of about 1000° F. for a period of about 6 hours.

While excellent results have been obtained by impregnating the platinum-alumina composite with boric acid solution then drying and calcining, it is to be understood that the invention is not to be so limited since the boric acid may be added to the alumina prior to the addition of the platinum, concurrently therewith or immediately following and prior to calcination. In any event, it is essential that the final catalyst composite contain from about 15% to about 25% by weight boron oxide.

For fuller understanding of the nature and objects of the invention, reference should be had to the following examples which are set forth merely to further illustrate the invention and are not to be construed in a limiting sense.

Example 1

A continuous hydrogenation test was made using 20% $B_2O_3$ promoted platinum-alumina catalyst, the platinum content of which was 0.6% by weight. The feedstock was a desulfurized kerosene range material. The results of this test are summarized below:

Catalyst temperature, °F _____ 500
Pressure, p.s.i.g. _____ 900
Space velocity, w./hr./w _____ 3.9
Hydrogen rate, s.c.f./bbl _____ 5000
Liquid recovery:
  Wt. percent _____ 97–100
  Vol. percent _____ 98–101

| Inspections (Average) | Feed | Product |
|---|---|---|
| Gravity, °API | 41.4 | 43.0 |
| Distillation, °F.: | | |
| IBP | 366 | 316–326 |
| 10% | 416 | 398–403 |
| 50% | 466 | 459–461 |
| 90% | 536 | 528–533 |
| EP | 582 | 576–578 |
| Smoke Point, mm | 21 | 26–30 |
| Aniline Point, °F | 154 | 162 |
| Color, Saybolt | +16 | +30 |

The results of the continuous hydrogenation test indicates that excellent kerosene upgrading was obtained at moderate temperatures, that is, the smoke point of the feed was increased from 21 to a range of 26 to 30 mm. In addition, there was a substantial increase in aniline point and an improvement in color.

Example 2

A rocker bomb hydrogenation test with boria promoted platinum on alumina catalyst with a desulfurized Middle East kerosene resulted in an increased smoke point and API gravity as indicated in the data below:

| Catalyst | 20% $B_2O_3$ promoted 0.3% Pt. on $Al_2O_3$ | 2% $B_2O_3$ promoted 0.6% Pt. on $Al_2O_3$ |
|---|---|---|
| Catalyst Weight, g | 0.5 | 0.5 |
| Kerosene, g | 50 | 50 |
| Initial Pressure, Cold, $H_2$, p.s.i.g | 400 | 400 |
| Maximum Pressure at Temperature, p.s.i.g | 850 | 850 |
| Temperature, °F | 700 | 700 |
| Hours at Temperature | 12.3 | 12 |

| Inspections | Feed | Product | Product |
|---|---|---|---|
| Gravity, °API | 41.4 | 45.0 | 42.1 |
| Smoke Point, mm | 21 | 27 | 25 |
| Aniline Point, °F | 154 | 156 | 158 |

In hydrogenating a hydrocarbon fraction such as kerosene with net consumption of hydrogen with the catalyst disclosed herein, the conditions may be varied rather widely; thus temperatures of about 100° F. to about 900° F. are suitable and the preferred range is from about 400° F. to about 600° F. Within these temperature limits, weight space velocities of about 0.5 to about 20 of hydrocarbon per hour per pound of catalyst in the reaction zone may be employed advantageously; however, we prefer space velocities of about 2 to about 8. Hydrogen should be introduced into the hydrogenation reactor at rates running from about 0.5 to about 20 mols hydrogen per mol of hydrocarbon reactant. While the total reaction pressure may be maintained at any value between about 0 and about 2000 pounds per square inch gauge, we prefer to hold the reaction pressure within the range of about 300 to about 1000 p.s.i.g.

Although the continuous tests were carried out with a fixed bed of catalyst extrusions, the present contact materials are not limited to this form or to hydrogenation in this particular manner. The catalyst may also be in lump, pellet, pill, granular, or powdered state and these may be used with equal success in both fluidized systems and those employing moving beds of granular contact material in either concurrent or countercurrent flow relative to the reactants. With a powdered contact material, it is contemplated that the catalyst may be circulated through the reaction or regeneration zones or both as a relatively dilute dispersion in a high velocity stream of reactant or of regeneration gases, or may be present in one or both of these zones as a dense phase feed through which the gases pass upwardly. In a latter instance, there may be a fixed bed of contact material in which the hydrogenation and regeneration operations are conducted alternatively.

Since certain changes may be made in both the process for hydrogenating hydrocarbons and the catalyst or process for preparation as described without departing from the scope of the invention, it is intended that all matter contained in the above description shall be interpreted as illustrative and not in a limiting sense.

We claim:

A process which comprises mixing a solution of a volatilizable mercury compound and a minor proportion of a compound of a metal of the group consisting of platinum or palladium with a major proportion of an adsorptive alumina carrier, calcining the resulting composite at a temperature of about 600 to about 1200° F. for a period sufficient to volatilize substantially all mercury-containing substances and convert the said metal compound to a metal residue on the adsorptive carrier, soaking said composite with boric acid to incorporate within a dried and calcined composite thereof from about 15% to about 25% by weight boron oxide.

References Cited in the file of this patent

UNITED STATES PATENTS 2,625,504    Haensel et al. _____ Jan. 13, 1953
2,662,861    Riblett et al. _____ Dec. 15, 1953
2,751,333    Heinemann _____ June 19, 1956

OTHER REFERENCES

Berkman et al.: "Catalyst"; 1940 Edition; Reinhold Publishing Co., N.Y.C., N.Y., page 244.